United States Patent
Mou et al.

(10) Patent No.: US 10,608,274 B2
(45) Date of Patent: Mar. 31, 2020

(54) REDOX FLOW BATTERY AND METHOD FOR OPERATING THE BATTERY CONTINUOUSLY IN A LONG PERIOD OF TIME

(75) Inventors: Liufeng Mou, Beijing (CN); Mianyan Huang, Beijing (CN); Andy Peter Klassen, North Vancouver (CA); Matthew A. M. Harper, Vancouver (CA)

(73) Assignee: BEIJING PU NENG CENTURY SCI. & TECH. CO. LTD., Beijing (CN)

( * ) Notice: Subject to any disclaimer, the term of this patent is extended or adjusted under 35 U.S.C. 154(b) by 567 days.

(21) Appl. No.: 12/810,950

(22) PCT Filed: Dec. 14, 2009

(86) PCT No.: PCT/CN2009/001434
§ 371 (c)(1),
(2), (4) Date: Aug. 24, 2011

(87) PCT Pub. No.: WO2011/050507
PCT Pub. Date: May 5, 2011

(65) Prior Publication Data
US 2011/0300417 A1     Dec. 8, 2011

(30) Foreign Application Priority Data
Oct. 29, 2009   (CN) .......................... 2009 1 0210176

(51) Int. Cl.
*H01M 8/18* (2006.01)
*H01M 8/04082* (2016.01)
*H01M 8/04276* (2016.01)

(52) U.S. Cl.
CPC ....... *H01M 8/188* (2013.01); *H01M 8/04201* (2013.01); *H01M 8/04276* (2013.01); *H01M 8/04216* (2013.01); *Y02E 60/528* (2013.01)

(58) Field of Classification Search
CPC ....................................................... H01M 8/188
(Continued)

(56) References Cited

U.S. PATENT DOCUMENTS 3,540,934 A * 11/1970 Boeke ........................... 429/409
5,725,967 A    3/1998 Mark
(Continued)

FOREIGN PATENT DOCUMENTS

CN    1643722 A    7/2005
JP    63-58771 A    3/1988
(Continued)

OTHER PUBLICATIONS

Machine translation of JP11-204124.*
(Continued)

*Primary Examiner* — Maria Laios
(74) *Attorney, Agent, or Firm* — Stoel Rives LLP

(57) ABSTRACT

The present invention provides a redox flow battery comprising a positive electrolyte storage tank and a negative electrolyte storage tank, wherein the positive electrolyte storage tank and the negative electrolyte storage tank is kept to be in liquid communication through a pipe, wherein the length-to-diameter ratio of the pipe for the liquid communication is not less than about 10. The present invention also provides a method for operating the redox flow battery continuously in a long period of time.

15 Claims, 2 Drawing Sheets

(58) Field of Classification Search
USPC .................................................. 429/50, 101
See application file for complete search history.

(56) References Cited

U.S. PATENT DOCUMENTS

| | | |
|---|---|---|
| 6,764,789 B1 | 7/2004 | Sekiguchi et al. |
| 2008/0241643 A1* | 10/2008 | Lepp et al. ................. 429/61 |

FOREIGN PATENT DOCUMENTS

| | | |
|---|---|---|
| JP | 9-180745 A | 7/1997 |
| JP | 11-204-124 A | 7/1999 |
| JP | 2001-043884 A | 2/2001 |
| JP | 2001-167787 A | 6/2001 |
| JP | 2002-237323 A | 8/2002 |
| JP | 2003-303611 A | 10/2003 |
| JP | 2008-164455 A | 7/2008 |
| KR | 1019990076812 | 10/1999 |
| KR | 1020010106463 | 11/2001 |

OTHER PUBLICATIONS

International Search Report: dated Aug. 12, 2019; PCT/CN2009/001434.
Japanese Office Action dated Oct. 12, 2016 Appln. No. 2011-537821 (Family of U.S. Appl. No. 12/810,950).

* cited by examiner

REDOX FLOW BATTERY AND METHOD FOR OPERATING THE BATTERY CONTINUOUSLY IN A LONG PERIOD OF TIME

TECHNICAL FIELD

The present invention relates to a redox flow battery, more specifically relates to a redox flow battery which is capable of continuous and stable operation in a long period of time. The present invention also relates to a method for operating the battery continuously in a long period of time.

BACKGROUND OF THE INVENTION

Conventional energy is being replaced by renewable energy because of the energy crisis and the environment pressure. The renewable energy such as wind energy and solar energy and the like has been developed in large scale. However, the impacts to the electricity power grid due to the instability of such kind of energy are getting worse and worse. Therefore, it is necessary to research and develop a high capacity energy storage system, which is low-cost and has high-efficiency, for load-shifting to obtain a stable renewable energy. Among a number of energy storage systems, redox flow battery has been developed intensively because of its advantages of adjustable capacity, free of solid phase reaction, free of change of the electrode material microstructures, low cost, long life, high reliability, and low cost for operation and maintenance.

Vanadium redox flow battery (hereafter referred to as VRB) is a renewable battery energy storage system based on the redox reaction of metal element vanadium. In a vanadium battery, electricity energy is stored in sulfate electrolyte of vanadium ions of different valences in the form of chemical energy. The electrolyte is forced into the battery stack by an external pump and thus is circulated in a closed circuit comprised of different storage tanks and half cells. With a proton exchange membrane (PEM) which serves as a separator of the battery, electrolyte solutions flow in parallel across the surfaces of electrodes and an electrochemical reaction occurs. Electricity current is gathered and conducted by bipolar plates. In this way, the chemical energy stored in the electrolyte solutions is converted into electricity energy. Such a reversible reaction enables the vanadium battery to charge, discharge, and recharge smoothly.

However, during charge/recharge cycles of the VRB, the migration of ions and water between a positive electrode and a negative electrode causes the electrolytes to be out of balance gradually, and thus the efficiency and the capacity of the battery is decreased, as occurred in other kind of redox flow batteries.

In order to solve the problem, a complex procedure is necessary to mix the positive and negative electrolytes to an initial state after a period of operation. Such a procedure is quite complex and needs additional electricity power to perform the mixing procedure.

With respect to the conventional process, U.S. Pat. No. 6,764,789 discloses two substitutive methods: the batchwise liquid adjusting method and the overflow method. The batchwise liquid adjusting method is performed by pumping the positive or negative electrolyte in storage tank whose liquid level has raised into the negative or positive electrolyte in storage tank whose liquid level has lowered after several (e.g., 30) charge/discharge cycles, and the overflow method is performed by setting an initial level difference between the positive electrolyte storage tank and the negative electrolyte storage tank and allowing the increased electrolyte in one of the positive electrolyte storage tank and the negative electrolyte storage tank whose liquid level has raised to flow into the other one whose liquid level has lowered through a pipe connecting both tanks of the positive electrolyte and the negative electrolyte with the aid of gravity.

SUMMARY OF THE INVENTION

In order to prevent the decrease of the capacity of the battery caused by the migration of ions and water between the positive electrode and the negative electrode during charge/recharge of the VRB from occurring and to reduce the frequency of the conventional mixing procedure so as to enable the battery to operate continuously in a long term, the inventors have studied intensively and have discovered unexpectedly that such an object can be achieved by keeping the positive electrolyte storage tank and the negative electrolyte storage tank to be in liquid communication.

Therefore, an object of the present invention is to provide a redox flow battery comprising a positive electrolyte storage tank and a negative electrolyte storage tank, wherein the positive electrolyte storage tank and the negative electrolyte storage tank is kept to be in liquid communication through a pipe, wherein a length-to-diameter ratio (hereafter referred to as L/D ratio) of the pipe for the liquid communication is not less than about 10.

Another object of the present invention is to provide a method for operating a redox flow battery continuously in a long period of time, said redox flow battery comprises a positive electrolyte storage tank and a negative electrolyte storage tank, said method comprises keeping the positive electrolyte storage tank and the negative electrolyte storage tank to be in liquid communication through a pipe, wherein the L/D ratio of the pipe for the liquid communication is not less than about 10.

According to the present invention, the complex procedure of mixing the positive and negative electrolytes to an initial state after a period of operation can be omitted and the additional electricity power for redistributing and remixing the electrolytes is not necessary. According to the present invention, the self discharge between the positive electrode and the negative electrode can be reduced or inhibited effectively by selecting an appropriate L/D ratio. According to the present invention, the liquid levels of the positive and negative electrolyte storage tanks can be kept being substantially equal in a long period of time, and thus the capacity of the battery during operation is kept stable in a long period of time and the reliability of the battery is high. According to the present invention, the manufacturing cost can be reduced remarkably and furthermore, the economic benefit of the product can be improved remarkably. According to the present invention, a battery system can be obtained which is capable of keeping the capacity and a current efficiency of the battery to be stable in a long period of time.

DETAIL DESCRIPTION OF THE INVENTION

In the context of this disclosure, the technical term "length-to-diameter ratio (L/D ration)" refers to the ratio of the length to the diameter of pipe, unless otherwise specified. Moreover, numerical ranges mentioned in this disclosure are inclusive of values of end points. The expression of "about" indicates that the value specified can vary in a range of ±5%. The expression of "approximate value" indicates that the value specified can vary in a range of ±5%.

In a first aspect of the present invention, a redox flow battery comprising a positive electrolyte storage tank and a negative electrolyte storage tank is provided, wherein the positive electrolyte tank and the negative electrolyte storage tank is kept to be in liquid communication through a pipe, wherein the length-to-diameter ratio (hereafter referred to as L/D ratio) of the pipe for the liquid communication is not less than about 10.

Figure 1:
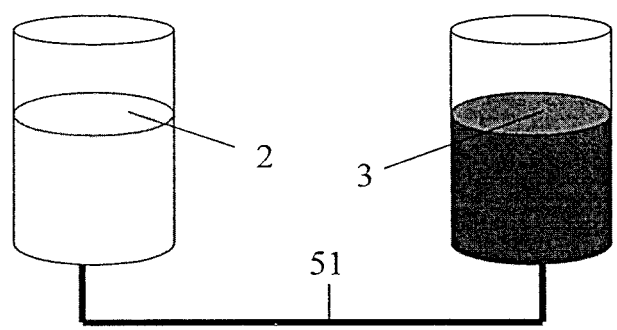
FIG. 1 is a schematic drawing illustrating one form of liquid communication between the positive electrolyte storage tank and the negative electrolyte storage tank in the redox flow battery according to the present invention.
Figure 2:
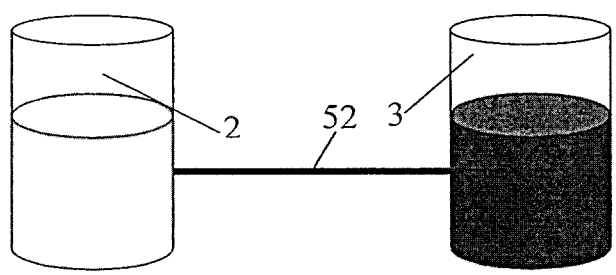
FIG. 2 is a schematic drawing illustrating another form of liquid communication between the positive electrolyte storage tank and the negative electrolyte storage tank in the redox flow battery according to the present invention.
Figure 3:
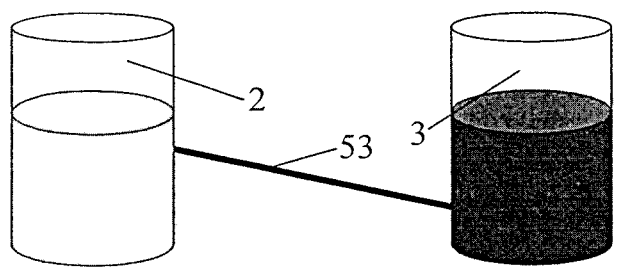
FIG. 3 is a schematic drawing illustrating yet another form of liquid communication between the positive electrolyte storage tank and the negative electrolyte storage tank in the redox flow battery according to the present invention.

In a preferred embodiment, the positive electrolyte storage tank and the negative electrolyte storage tank is kept in liquid communication through a pipe located below the liquid levels of the respective storage tanks. For example, the liquid communication may be kept through a pipe on the bottoms of the respective storage tanks or on the sides below the liquid level of the respective storage tanks. FIGS. 1 to 3 schematically illustrate three forms of liquid communication, wherein a positive electrolyte storage tank 2 and a negative electrolyte storage tank 3 are communicated through pipes 51, 52 and 53, respectively. It can be seen from to the figures that, in the scope of the present invention, the communicating pipes may be horizontal or vertical, and the communicating pipes may connect to the bottoms of the positive electrolyte storage tank and the negative electrolyte storage tank or may connect to the bottom of any one of the positive electrolyte storage tank and the negative electrolyte storage tank at one end and to a side of the other one at the other end, as long as the positive electrolyte storage tank and the negative electrolyte storage tank is kept in liquid communication. Therefore, there is no specific limitation to the position where the pipe connects to the electrolyte storage tanks, and the position may be determined according to the specific situation such as dimensions of the equipment, dimensions of plant building, and the like.

In a preferred embodiment, an L/D ratio of the pipe for the liquid communication is in the range of about 20 to about 1000, preferably in the range of about 40 to about 600, more preferably in the range of about 60 to about 400, most preferably in the range of about 80 to about 200, .e.g., 90, 100, 110, 120, 130, 140, 150, 160, 170, 180, 190, or an approximate value thereof.

The existence of the pipe enables to keep the liquid level of the positive and negative electrolyte storage tank being substantially identical (according to communicating vessel principle) in a long period of time, while an appropriate L/D ratio enables to effectively reduce or inhibit self discharge between the positive and negative electrodes unexpectedly. In the case of the preferred L/D ratio according to the present invention, when the ion concentration at one end of the pipe become slightly higher after several charge/discharge cycles, vanadium ions at said one end of the pipe migrate to the other end through the pipe due to the difference of concentration; therefore, the concentrations of the vanadium ions at both sides of positive electrode and negative electrode can be ensured to be substantially identical, while a current efficiency is not remarkably reduced.

On the contrary, if the L/D ratio is not in the range recommended according to the present invention, e.g., less than 10, vanadium ions will rapidly migrate from one end to the other through the communicating pipe, which leads to short-circuit of the battery. Therefore, not only the current efficiency is remarkably reduced, but the charge/discharge capacity of the battery is also reduced continuously.

The pipe for liquid communication can be made of any material which is electrolyte corrosion resistant, preferably a polymer material which is electrolyte corrosion resistant, for example, at least one material selected from the group consisting of polyvinyl chloride, polypropylene, polyethylene, polytetrafluoroethylene, polyvinylidene fluoride, chlorinated polyethylene, chlorinated polypropylene, poly(vinylidene difluoride), polyester, polycarbonate, polyalcohols, polysulfone, polyethersulfone, polyether, polyamide, polyimide, polyphenylene sulfide, poly(ether-ketone), poly(ether-ether-ketone), poly(pathalazinone ether ketone), polybenzimidazole, polystyrene, polyisobutylene, and polyacrylonitrile.

There is no specific limitation to the connection form of the pipe for the liquid communication with the positive and negative electrolyte storage tanks, as long as a secure connection is ensured and the electrolyte is free of leakage. For example, the pipe for the liquid communication may connect to the electrolyte storage tanks by at least one method of flange-connection, welding, and adhesion. Alternatively, the pipe for the liquid communication may connect to the electrolyte storage tanks in the form of integral formation.

There is no specific limitation to the shape and configuration of the pipe for the liquid communication, as long as the objects of the present invention are achieved. For example, the pipe for the liquid communication may be a separate long straight pipe between the positive and the negative electrolyte storage tanks, or it may comprise a plurality of bend parts, or it may be coiled on the positive and the negative electrolyte storage tanks to save space, or it may be in any other form.

In a preferred embodiment, the pipe for the liquid communication can be provided with a valve which can be opened or closed on demand.

In a preferred embodiment, the redox flow battery may be any type of redox flow battery using single metal solution as electrolyte or a battery of any other types, for example, it may be a vanadium (V), chromium (Cr), or cobalt (Co)-based battery, a zinc-bromine battery, sodium polysulfide-bromine battery, iron-chromium battery, and the like, preferably a vanadium redox flow battery (VRB).

In another aspect of the present invention, a method for operating a redox battery continuously in a long period of time is provided, said redox battery comprises a positive electrolyte storage tank and a negative electrolyte storage tank, said method comprises keeping the positive electrolyte storage tank and the negative electrolyte storage tank to be in liquid communication through a pipe, wherein a L/D ratio of the pipe for the liquid communication is not less than about 10.

In a preferred embodiment, said method comprises keeping the positive electrolyte storage tank and the negative electrolyte storage tank to be in liquid communication through a pipe located below liquid levels of the respective storage tanks. For example, the liquid communication may be kept through a pipe located on the bottoms of the respective storage tanks or on the sides below the liquid levels of the respective storage tanks. FIGS. 1 to 3 schematically illustrate three forms of liquid communication, wherein the positive electrolyte storage tank 2 and the negative electrolyte storage tank 3 are communicated through pipes 51, 52 and 53, respectively. It can be seen from the figures that, in the scope of the present invention, the communicating pipe may be horizontal or vertical, and the communicating pipe may connect to the bottoms of the positive electrolyte storage tank and the negative electrolyte storage tank or one end of the communicating pipe may connect to the bottom of any one of the positive electrolyte storage tank and the negative electrolyte tank and the other end to the side of the other one, as long as the positive electrolyte tank and the negative electrolyte tank is kept in liquid communication. Therefore, there is no specific limitation to the connection form of the pipe, and the connection form of the pipe may be determined according to specific situation, such as dimensions of the equipment, dimensions of plant building, and the like.

In a preferred embodiment, said method comprises using a pipe for liquid communication having an L/D ratio in the range of about 20 to about 1000, preferably in the range of about 40 to about 600, more preferably in the range of about 60 to about 400, most preferably in the range of about 80 to about 200, e.g., 90, 100, 110, 120, 130, 140, 150, 160, 170, 180, 190, or an approximate value thereof.

The pipe for liquid-connection can be made of any material which is electrolyte corrosion resistant, preferably a polymer material which is electrolyte corrosion resistant, for example, at least one material selected from the group consisting of polyvinyl chloride, polypropylene, polyethylene, polytetrafluoroethylene, polyvinylidene fluoride, chlorinated polyethylene, chlorinated polypropylene, poly(vinylidene difluoride), polyester, polycarbonate, polyalcohols, polysulfone, polyethersulphone, polyether, polyamide, polyimide, polyphenylene sulfide, poly(ether-ketone), poly (ether-ether-ketone), poly(pathalazinone-ether-ketone), polybenzimidazole, polystyrene, polyisobutylene, and polyacrylonitrile.

There is no specific limitation to the connection form of the pipe for the liquid communication with the positive and the negative electrolyte storage tanks, as long as a secure connection is ensured and the electrolyte is free of leakage. For example, the pipe for the liquid communication may connect to the electrolyte storage tanks by at least any one method of flange-connection, welding, and adhesion. Alternatively, the pipe for the liquid communication may connect to the electrolyte storage tanks in the form of integral formation.

There is no specific limitation to the shape and configuration of the pipe for the liquid communication, as long as the objects of present invention are achieved. For example, the pipe for the liquid communication may be a separate long straight pipe between the positive and the negative electrolyte storage tanks, or it may comprise a plurality of bend parts, or it may be coiled on the positive and negative electrolyte storage tanks to save space, or it may be in any other form.

In a preferred embodiment, the pipe for the liquid communication can be provided with a valve which can be opened or closed on demand.

In a preferred embodiment, the redox flow battery may be any kind of redox flow battery using single metal solution as electrolyte or a flow battery of other types. For example, it may be a vanadium (V), chromium (Cr), or cobalt (Co)-based battery, a zinc-bromine battery, sodium polysulfide-bromine battery, iron-chromium battery, and the like, preferably a vanadium redox flow battery (VRB).

EXAMPLES

The present invention will be illustrated in more detail with reference to examples of VRB. However, present invention will not limit thereto.

Figure 4:
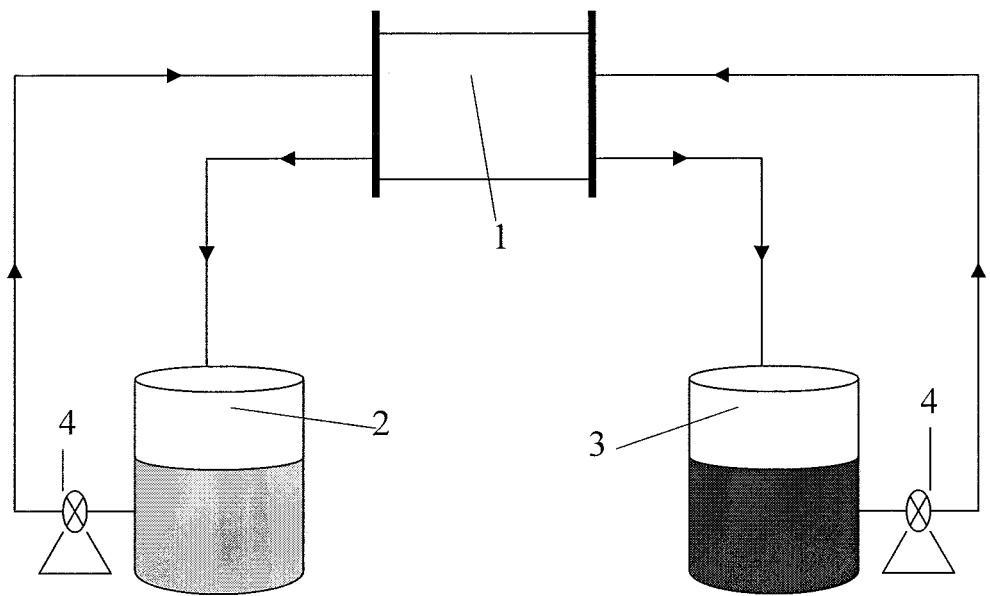
FIG. 4 is a schematic drawing illustrating a basic configuration of a conventional VRB.

FIG. 4 illustrates a basic configuration of a conventional VRB which will be described as follows:

1) Battery stack 1 consists of 5 single cells, and the battery stack 1 is free of internal leakage on testing.

2) The reaction area of the cell is 300 $cm^2$.

3) A Nafion 115 membrane is used.

4) An V ion concentration of the electrolyte is 1.5 M (i.e., 1.5 mol/L).

5) The electrolyte is forced into the battery stack 1 by an external pump 4.

6) The battery stack is charged/discharged at a constant current of 70 $mA/cm^2$, at a charge cut-off voltage of 1.6 V and a discharge cut-off voltage of 1.1 V, and a period of one charge/discharge cycle is 2 hours.

7) Initial height of liquid levels of both the positive electrolyte storage tank 2 and the negative electrolyte storage tank 3 is 12 cm.

Figure 5:
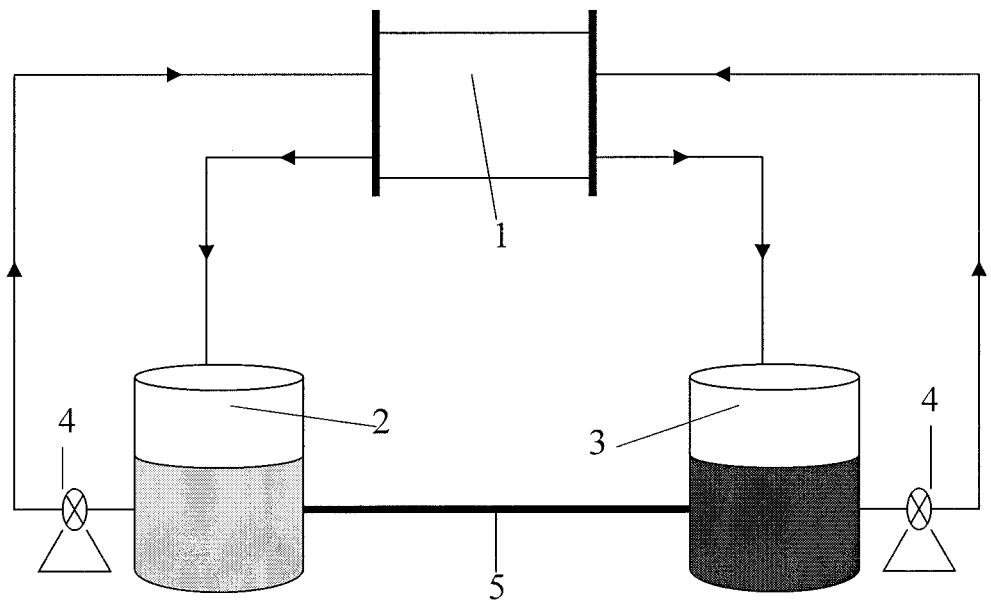
FIG. 5 is a schematic drawing illustrating a basic configuration of a VRB having the liquid communication pipe according to the present invention.

FIG. 5 illustrates a basic configuration of a VRB having the liquid communicating pipe according to the present invention, which differs from the conventional VBR as shown in FIG. 4 only in that the positive electrolyte storage tank 2 and the negative electrolyte storage tank 3 are in liquid communication through a pipe 5.

Example 1

A VRB as shown in FIG. 5 is used, wherein the length of the pipe 5 is 225 mm, the internal diameter thereof is 15 mm, and the L/D ratio thereof is 15.

Example 2

A VRB as shown in FIG. 5 is used, wherein the length of the pipe 5 is 480 mm, the internal diameter thereof is 10 mm, and the L/D ratio thereof is 48.

Example 3

A VRB as shown in FIG. 5 is used, wherein the length of the pipe 5 is 760 mm, the internal diameter thereof is 10 mm, and the L/D ratio thereof is 76.

Example 4

A VRB as shown in FIG. 5 is used, wherein the length of the pipe 5 is 498 mm, the internal diameter thereof is 6 mm, and the L/D ratio thereof is 83.

Example 5

A VRB as shown in FIG. 5 is used, wherein the length of the pipe 5 is 500 mm, the internal diameter thereof is 4 mm, and the L/D ratio thereof is 125.

Example 6

A VRB as shown in FIG. 5 is used, wherein the length of the pipe 5 is 800 mm, the internal diameter thereof is 4 mm, and the L/D ratio thereof is 200.

Example 7

A VRB as shown in FIG. 5 is used, wherein the length of the pipe 5 is 1280 mm, the internal diameter thereof is 4 mm, and the L/D ratio thereof is 320.

Example 8

A VRB as shown in FIG. 5 is used, wherein the length of the pipe 5 is 1600 mm, the internal diameter thereof is 4 mm, and the L/D ratio thereof is 400.

Example 9

A VRB as shown in FIG. 5 is used, wherein the length of the pipe 5 is 2320 mm, the internal diameter thereof is 4 mm, and the L/D ratio thereof is 580.

Example 10

A VRB as shown in FIG. 5 is used, wherein the length of the pipe 5 is 4800 mm, the internal diameter thereof is 6 mm, and the L/D ratio thereof is 800.

Example 11

A VRB as shown in FIG. 5 is used, wherein the length of the pipe 5 is 7200 mm, the internal diameter thereof is 6 mm, and the L/D ratio thereof is 1200.

Comparative Example 1

A VRB as shown in FIG. 4 is used, wherein there does not exist a pipe between the positive and the negative electrolyte tanks.

Comparative Example 2

A VRB as shown in FIG. 5 is used, wherein the length of the pipe 5 is 120 mm, the internal diameter thereof is 15 mm, and the L/D ratio thereof is 8.

Testing

A μC-XCF Microcomputer Battery Cycling Charge/Discharge Tester (made by Jiangsu Jinfan Power Technology Co., Ltd., China) is used. A graduation ruler is used to measure the height difference between liquid levels of the positive and the negative electrolyte storage tanks. A potentiometric titration method in accordance with GB/T 8704.5-1994 is employed to measure the change of vanadium ion concentration in the positive and the negative electrolyte storage tanks.

Testing results are shown in the following table.

TABLE 1

| No. | L/D ratio | Current Efficiency (%) (Average Value over 100 Cycles) | Height Difference Between Liquid Levels of Positive and Negative Electrolyte Storage Tanks (cm) (After 100 Cycles) | Change of Vanadium Ion Concentration in Positive and Negative Electrolyte Tanks (M) (After 100 Cycles) |
|---|---|---|---|---|
| Example 1 | 15 | 75.4% | 0.10 | 0.12 |
| Example 2 | 48 | 80.7% | 0.23 | 0.16 |
| Example 3 | 76 | 87.8% | 0.58 | 0.18 |
| Example 4 | 83 | 92.3% | 0.82 | 0.20 |
| Example 5 | 125 | 93.1% | 1.04 | 0.24 |
| Example 6 | 200 | 93.3% | 1.30 | 0.25 |
| Example 7 | 320 | 93.8% | 1.89 | 0.27 |
| Example 8 | 400 | 94.2% | 2.08 | 0.28 |
| Example 9 | 580 | 94.8% | 2.53 | 0.32 |
| Example 10 | 800 | 95.0% | 2.98 | 0.39 |
| Example 11 | 1200 | 95.4% | 3.20 | 0.42 |
| Comparative Example 1 | N/A | 95.6% | 4.80 | 0.50 |
| Comparative Example 2 | 8 | 60.6% | 0.01 | 0.05 |

It can be seen in the above table that, in the redox flow battery according to the present invention after 100 cycles of charge/discharge, 1) the current efficiency of the batteries remains at or above 75%, and, in the preferred range of L/D ration, the current efficiency thereof reduces by less than 5 percentages comparing to the conventional redox flow battery (i.e., battery without the pipe for the liquid communication between the positive and the negative electrolyte storage tanks); 2) the liquid levels of the positive and the negative electrolyte storage tanks are substantially equal and the maximum difference between the liquid levels does not exceed 4 cm; 3) the change of the vanadium ion concentration in the positive and the negative electrolyte storage tanks does not exceed 0.45 M. This is because an ion balance region is formed in the pipe which makes the ion concentration in the positive and the negative electrolyte storage tanks to be stable.

On the contrary, in the case where a pipe for liquid communication (balancing pipe) is not used, the height difference between the liquid levels of the positive and the negative electrolyte storage tanks becomes 4.80 cm and the change of the vanadium ion concentration in the positive and the negative electrolyte storage tanks becomes 0.5 M after 100 charge/discharge cycles, whereas in the case that the L/D ratio of the balancing pipe is not in the range recommended according to the present invention, the current efficiency is only 60.6% after 100 charge/discharge cycle.

Furthermore, it is confirmed through test that, the battery capacity of the redox flow battery according to the present invention will not decrease after operation of at least two years.

Explanation of the Technical Terms

In the context of this disclosure, the "positive electrolyte storage tank" is also referred to as "positive liquid storage tank", the "negative electrolyte storage tank" is also referred to as "negative liquid storage tank", and the "pipe for liquid communication" is also referred to as "balancing pipe". These technical terms have the same meanings when refers to the members having the same function and are interchangeable.

While the redox flow battery according to the present invention has been described with respect to the specific embodiments, it will be apparent to those skilled in the art that various changes, modifications and/or substitutions may be made to the specific embodiments without departing from the spirit and scope of the invention. For example, the connection position, shape, material, and L/D ratio of the pipe for liquid communication may vary as the electrolyte changes, and so on.

The invention claimed is:

1. A redox flow battery, comprising:
   a battery;
   a positive electrolyte tank;
   a negative electrolyte tank; and
   a pipe, connected to the positive electrolyte tank and the negative electrolyte tank and configured to keep the positive electrolyte tank and the negative electrolyte tank in liquid communication with each other, and having a length-to-diameter ratio (L/D ratio) in the range of about 15 to about 800,
   wherein the pipe does not include a valve, and
   wherein the battery is in fluid communication with the positive electrolyte tank and the negative electrolyte tank.

2. The redox flow battery according to claim 1, wherein the pipe is located below the liquid levels of the respective tanks.

3. The redox flow battery according to claim 1, wherein the L/D ratio of the pipe is in the range of about 80 to about 200, such that the average value of the current efficiency of the redox flow battery is between about 92% and about 93% after 100 cycles of charge/discharge.

4. The redox flow battery according to claim 1, wherein the pipe is made of at least one material selected from the group consisting of polyvinyl chloride, polypropylene, polyethylene, polytetrafluoroethylene, polyvinylidene fluoride, chlorinated polyethylene, chlorinated polypropylene, poly(vinylidene difluoride), polyester, polycarbonate, polyalcohols, polysulfone, polyethersulphone, polyether, polyamide, polyimide, polyphenylene sulfide, poly(ether-ketone), poly(ether-ether-ketone), poly(pathalazinone-ether-ketone), polybenzimidazole, polystyrene, polyisobutylene, and polyacrylonitrile.

5. The redox flow battery according to claim 1, wherein the pipe is connected to the electrolyte tanks by at least any one method of flange-connection, welding, and adhesion.

6. The redox flow battery according to claim 1, wherein the pipe is connected to the electrolyte tanks in a form of integral formation.

7. The redox flow battery according to claim 1, wherein the pipe is coiled around a portion of at least one of the positive electrolyte tank or the negative electrolyte tank.

8. The redox flow battery according to claim 1, wherein the redox flow battery is a vanadium redox flow battery.

9. A method for operating a redox flow battery, the method comprising:
   keeping a positive electrolyte storage tank and a negative electrolyte storage tank in liquid communication with each other through a pipe during operation of the redox flow battery; and
   keeping the positive electrolyte storage tank and the negative electrolyte storage tank in communication with the battery;
   wherein a length-to-diameter ratio (L/D ratio) of the pipe is in the range of about 15 to about 800, and
   wherein the pipe does not include a valve.

10. The method according to claim 9, wherein the pipe is located below the liquid levels of the respective tanks.

11. The method according to claim 9, wherein the L/D ratio of the pipe is in the range of about 80 to about 200, such that the average value of the current efficiency of the redox flow battery is between about 92% and about 93% after 100 cycles of charge/discharge.

12. The method according to claim 9, wherein the pipe is made of at least one material selected from the group consisting of polyvinyl chloride, polypropylene, polyethylene, polytetrafluoroethylene, polyvinylidene fluoride, chlorinated polyethylene, chlorinated polypropylene, poly(vinylidene difluoride), polyester, polycarbonate, polyalcohols, polysulfone, polyethersulphone, polyether, polyamide, polyimide, polyphenylene sulfide, poly(ether-ketone), poly(ether-ether-ketone), poly(pathalazinone-ether-ketone), polybenzimidazole, polystyrene, polyisobutylene, and polyacrylonitrile.

13. The method according to claim 9, wherein the pipe is connected to the electrolyte storage tanks by at least any one method of flange-connection, welding, and adhesion.

14. The method according to claim 9, wherein the pipe is connected to the electrolyte storage tanks in a form of integral formation.

15. The method according to claim 9, wherein the redox flow battery is a vanadium redox flow battery.

* * * * *